Nov. 5, 1963 G. JACQUET 3,109,701
METHOD FOR PRODUCING SHOES WITH MOLDED SOLES OF
RUBBER OR PLASTIC MATERIAL
Filed July 1, 1960 3 Sheets-Sheet 1
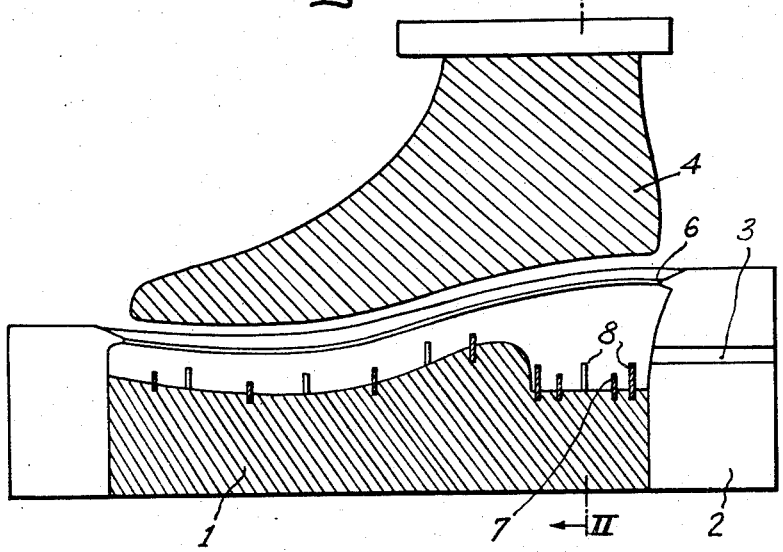
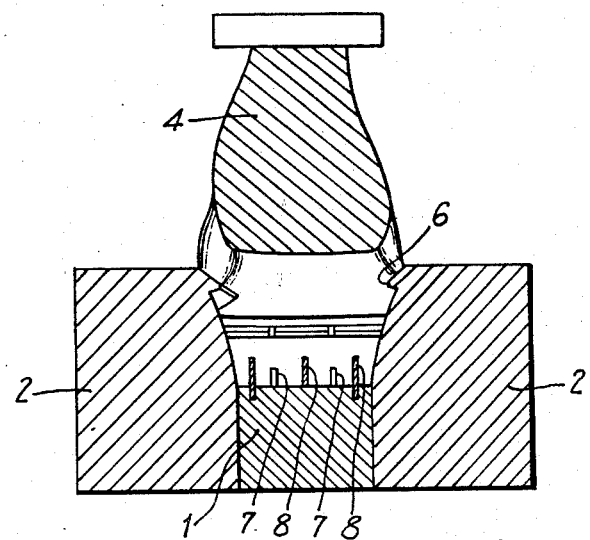
INVENTOR
GABRIEL JACQUET
BY Irvin S. Thompson
ATTORNEY INVENTOR
GABRIEL JACQUET
BY Irvin S. Thompson
ATTORNEY Nov. 5, 1963                 G. JACQUET                 3,109,701
         METHOD FOR PRODUCING SHOES WITH MOLDED SOLES OF
                     RUBBER OR PLASTIC MATERIAL
Filed July 1, 1960                              3 Sheets-Sheet 3
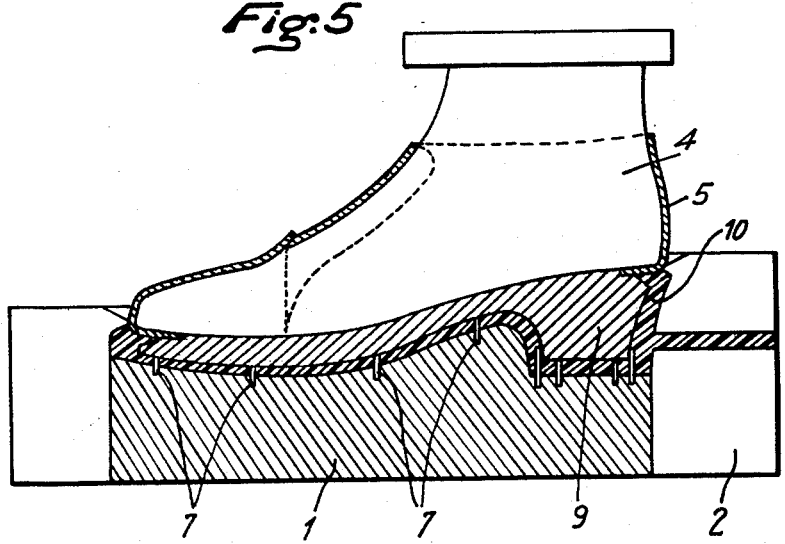
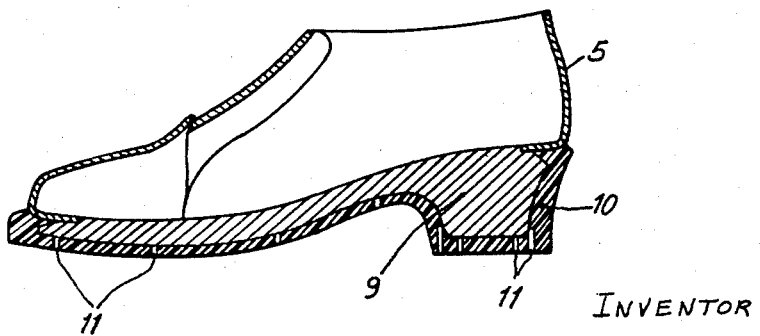
INVENTOR
GABRIEL JACQUET
BY Irvin S. Thompson
ATTORNEY

3,109,701
METHOD FOR PRODUCING SHOES WITH MOLDED SOLES OF RUBBER OR PLASTIC MATERIAL
Gabriel Jacquet, Montrevault, Maine-et-Loire, France
Filed July 1, 1960, Ser. No. 40,431
Claims priority, application France Jan. 8, 1960
1 Claim. (Cl. 18—59)

My invention has for its object the manufacture of shoes with soles made of molded rubber or plastic material as obtained through injection of rubber and plastic material inside a mold closed to one side by the inner sole, which is rigid with the upper sole or otherwise, so as to simultaneously form the sole and ensure its rigid connection with the inner sole.

In order to prevent an exaggerated weight of such a sole and for ensuring the rigidity of certain sections thereof, it is generally necessary to include, inside the heel and possibly inside the actual sole, filling or reinforcing members made of felt, compressed flock, wood or the like. Such filling elements were hitherto rigidly secured before any molding to the upper sole through gluing, stitching or the like so that they may retain during the molding their accurate position. Such a preliminary securing leads to comparatively long and costly operations which increase the cost of the shoe.

My invention has for its object to eliminate any preliminary securing of the filling elements to an inner sole or to the upper. According to said method, the filling or padding elements are held in position by blocks or pins which ensure a permanent and constant spacing between such filling elements and the wall of the mold and after positioning of said elements on said blocks or pins the sole is molded under pressure.

The blocks, made of any material, may be rigidly secured to the filling elements or be independent thereof and in all cases they remain enclosed inside the molded mass.

In such cases, however, the positioning of the blocks or the execution of filling elements incorporating the necessary block-forming projections form comparatively tedious and expensive operations.

In order to avoid the last-mentioned operations, I resort to a mold carrying fine pins parallel with the direction of the movements corresponding to the opening of the mold bottom with which they are rigid and on which the filling elements are to rest. Preferably, there are provided on the bottom of the mold two types of pins, to wit, shorter pins adapted to be engaged by the undersides of the filling elements so as to adjust the height of the latter and longer pins forming abutments for the lateral surfaces of the filling elements with a view to holding the latter sideways. When using such a pin-carrying mold, it is sufficient to lay the filling elements in their final location over and between the pins before closing the mold. After molding, the parallel pins are drawn easily out of the molded mass.

My invention also covers a mold, the bottom of which is provided with pins of the type referred to, said mold serving for the execution of my improved method.

The filling or padding may be executed by means of one or more separate elements and cuts may be provided for furthering the penetration of the moldable material into said elements.

I will now describe a number of embodiments of the method of forming the object of my invention, reference being made to the accompanying drawings.

In said drawings, FIG. 1 is a longitudinal diagrammatic sectional view of a mold for the execution of the method according to a preferred embodiment.

FIG. 2 is a sectional transverse view through line II—II of FIG. 1.

FIG. 5 is a view corresponding to FIG. 3 after molding.

FIG. 6 is a sectional view of the finished shoe.

Figure 3:
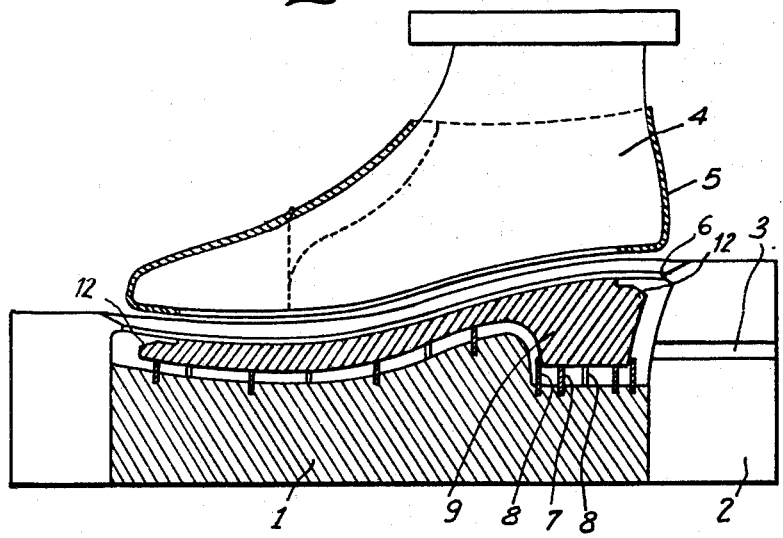
FIG. 3 is a view corresponding to FIG. 1, before the closing of the mold, the filling being inserted in the mold and the upper fitted over the last.

The method for producing the shoe is executed in a mold of any conventional type adapted for such a purpose. The mold may include for instance a bottom 1, two side walls 2 provided each in the plane of assembly thereof with two half-channels forming together an injecting channel 3 and a last 4 which, after it has been inserted in the upper sole 5 obtained through any conventional method, closes the opening of the mold. The material forming the upper sole is clamped fluid-tightly by the peripheral boss 6 formed on the sidewall of the mold.

In the embodiment illustrated, the surface of the bottom of the mold is provided with a series of parallel pins 7 and 8. The pins 7 extend upwardly towards the lower surface of the volume which is to be occupied by a filling 9, to be incorporated with the sole in the molding. The height of said pins 7 is thus equal to the thickness of the molded material to be obtained.

The pins 8 which are longer lie in the vicinity of the edge of the bottom of the mold and form abutments defining laterally the location of the filling 9.

Figure 4:
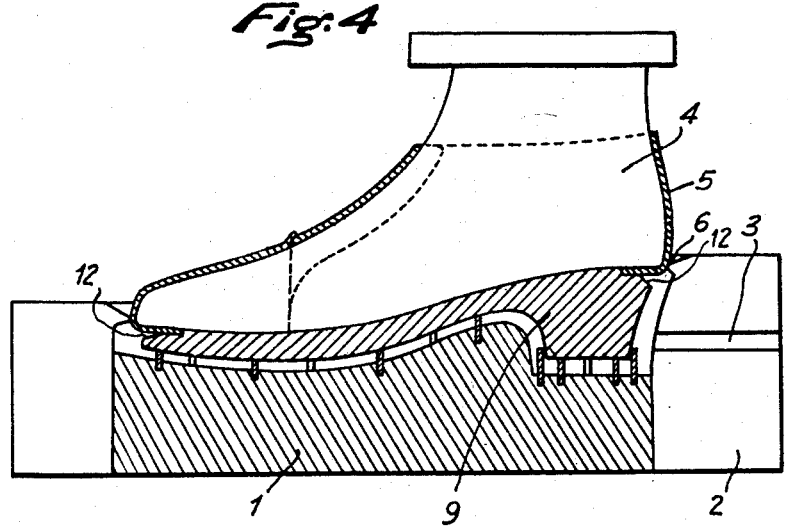
FIG. 4 is a view corresponding to FIG. 3 after closing of the mold.

The upper sole 5 being fitted over the last 4, the filling 9 is inserted in the mold as illustrated in FIG. 3. Said filling bears on the pins 7 and is held centrally in position by the pins 8. The mold is then closed as illustrated in FIG. 4, and the plastic material or rubber 10 (FIG. 5) is injected into the mold, whether thermoplastic, thermosetting, vulcanizable, etc. It is then sufficient to lift the article out of the mold, while the pins 7 and 8 may be readily removed and leave in the sole fine preferations 11.

The above described embodiment given by way of a mere example, is capable of many modifications and the method is applicable to all types of uppers over which it is desired to mold a sole with a filling of any suitable material. The filling described as a unitary filling may also be constituted by a plurality of separate elements. It may include cuts 12 which further the penetration of the molded material along the undersides of the edge of the upper sole, but such cuts are not always required. As disclosed, it is possible to substitute for the pins, blocks of any material which are merely laid inside the mold or glued to or otherwise secured to the filling.

The latter may include if desired bosses which provide for the desired spacing.

In the two last-mentioned cases the blocks or bosses are enclosed inside the molded mass forming the sole. The type of closure for the mold has also been illustrated by way of a mere exemplification.

What I claim is:

A method for producing a shoe having an upper sole, a molded sole and a filling element at least partly embedded within said molded sole, said method comprising the steps of placing said filling element within a mold recess which matches the shape of the sole to be molded, supporting said filling element in a predetermined position within said recess with a first set of pins, retaining said filling element against any lateral movement away from said predetermined position with a second set of pins longer than said first set, mounting said upper sole upon a last, closing the open, upper surface of said mold recess by means of said upper sole and last, with the lower edge of the upper sole disposed within said recess, injecting the material forming the sole to be molded into said recess between the walls thereof, said edge of the upper sole and said filling element, and then removing said upper sole, said filling element and said molded sole as a unit from said recess in a direction parallel to the axes of said pins.

References Cited in the file of this patent

UNITED STATES PATENTS

| | | |
|---|---|---|
| 791,648 | Richards | June 6, 1905 |
| 1,426,198 | Keith | Aug. 15, 1922 |
| 1,532,383 | Cleland | Apr. 7, 1925 |
| 2,129,106 | Szerenyi et al. | Sept. 6, 1938 |
| 2,361,348 | Dickson | Oct. 24, 1944 |
| 2,437,030 | Hoza | Mar. 2, 1948 |
| 2,522,021 | Dewey | Sept. 12, 1950 |
| 2,651,118 | Root | Sept. 8, 1953 |
| 2,795,822 | Long | June 18, 1957 |
| 2,820,251 | Fraser | Jan. 21, 1958 |
| 2,830,324 | Farmer et al. | Apr. 15, 1958 |
| 2,878,523 | Hardy | Mar. 24, 1959 |
| 2,985,919 | Borroff et al. | May 30, 1961 |
| 2,994,920 | Patera | Aug. 8, 1961 |

FOREIGN PATENTS

| | | |
|---|---|---|
| 121,239 | Great Britain | Dec. 12, 1918 |